United States Patent

Wellauer et al.

[11] 4,044,572
[45] Aug. 30, 1977

[54] SERPENTINE GRID FLEXIBLE COUPLING

[75] Inventors: Edward J. Wellauer, Wauwatosa; John A. Strommen, West Allis, both of Wis.

[73] Assignee: The Falk Corporation, Milwaukee, Wis.

[21] Appl. No.: 675,324

[22] Filed: Apr. 9, 1976

[51] Int. Cl.² .................................................. F16D 3/52
[52] U.S. Cl. ............................... 64/15 B; 64/12; 64/27 B
[58] Field of Search ............. 64/15 B, 12, 15 R, 27 B

[56] References Cited

U.S. PATENT DOCUMENTS

| | | | |
|---|---|---|---|
| 1,216,227 | 2/1919 | Grundy | 64/15 B |
| 1,391,713 | 9/1921 | Bibby | 64/15 B |
| 1,891,969 | 12/1932 | Bibby | 64/15 B |
| 3,096,631 | 7/1963 | Seireg et al. | 64/15 B |
| 3,096,632 | 9/1963 | Wellauer et al. | 64/15 B |

Primary Examiner—Samuel Scott
Assistant Examiner—Randall Heald
Attorney, Agent, or Firm—Quarles & Brady

[57] ABSTRACT

A flexible shaft coupling is disclosed in which hub members each having a plurality of axially directed peripheral teeth are adapted for mounting on the shafts to be coupled. In one embodiment, the grooves between the teeth are provided with a rounded bottom and a serpentine grid element interconnects the hub members. The grid element has a circular cross section and includes rungs which are seated in the grooves of both hub members. In other embodiments more than one layer of rungs having circular cross sections are seated in the grooves. The grooves may also have side walls which diverge radically outwardly, and the outer layers of rungs may have a greater diameter than the radially inner layers.

2 Claims, 5 Drawing Figures

SERPENTINE GRID FLEXIBLE COUPLING

BACKGROUND OF THE INVENTION

This invention relates to flexible shaft couplings, and more particularly to flexible couplings of the type in which coupling hub members affixed to adjacent ends of the shafts to be coupled are each provided with axially directed peripheral teeth which define grooves adapted to receive resilient interconnecting grid members.

The shaft couplings in which a grid interconnects with teeth of hubs disposed on adjacent ends of driving and driven shafts, with the grid functioning as the resilient torque transmitting element between the shafts, have found wide use since first proposed in U.S. Pat. No. 1,391,713 issued Sept. 27, 1921 to J. Bibby. Such couplings are able to accommodate parallel and angular misalignments of the coupled shafts and also permit axial end float of the shafts by reason of the ability of the grid to slide in the grooves between the teeth. The side walls of the teeth are normally crowned, as in the Bibby patent, so that the unsupported length of the rungs of the grid which span the space between the hubs will decrease as the torsional load increases. This torsional flexibility permits the coupling to absorb impact energies thus dampening vibration and reducing peak or shock loads.

In the Bibby U.S. Pat. No. 1,391,713 the grid was formed of a stout wire bent to and fro and the grooves between the teeth of the hub members were formed with a square bottom and parallel sides. Subsequent forms of the basic type of coupling have used grids with rectangular cross sections also in grooves having square bottoms, as exemplified by U.S. Pat. No. 2,969,658 of E. J. Wellauer, issued Jan. 31, 1961, and grids with a generally trapazoidal cross section with mating tapered grooves, as illustrated in U.S. Pat. No. 3,079,773 of W. P. Schmitter, issued Mar. 5, 1963. Bent wires have also been employed to form interconnecting spring elements in a different form of flexible coupling illustrated in German Pat. No. 735,393 issued May 13, 1943 to Albert Tacke.

It is a principal object of this invention to provide a flexible coupling of the type using an interconnecting grid which will exhibit improved fatigue life as compared with the forms of couplings heretofore known. The improved fatigue life is achieved by providing a coupling in which the grooves defined between the teeth of the hubs have a rounded bottom, and in which the interconnecting grid has rungs of a circular cross section which are seated in the grooves.

It is another object of this invention to provide a flexible coupling which employs to maximum advantage the greater flexibility inherent in an interconnecting grid having rungs of circular cross section. The greater flexibility is employed to achieve excellent operating characteristics and also to permit ease of assembly. The ease of assembly is enhanced by providing the grooves with side walls which diverge outwardly from the axis of rotation of the hubs. The ease of assembly is particularly important when more than a single layer of rungs are disposed in each groove. Multiple layers of grids will reduce the stiffness of the coupling compared to a single grid with the same torque transmitting capacity.

SUMMARY OF THE INVENTION

A flexible coupling in accordance with the invention comprises a pair of hubs connectable to the shafts to be coupled, with each hub having a plurality of axially extending teeth which define therebetween a series of axially directed grooves. The grooves are provided with a rounded radially innermost surface, and a grid interconnects the teeth of both hubs and includes a series of rungs of circular cross section each lying in a groove of each hub.

Further in accordance with the invention, there may be provided a flexible coupling in which each of a pair of hubs has axially directed grooves having side walls which diverge outwardly from the axis of the hub, together with an interconnecting grid including a series of rungs of circular cross section each disposed in a groove of each hub.

Also in accordance with the invention, such flexible couplings may be provided with a second interconnecting grid with rungs of circular cross section.

In addition to the objects of the invention set forth above, further objects of the present invention are: to improve the lubrication between the grid and the grooves in which the grid rungs seat; to provide for greater flexibility in the coupling by the use of grid members of circular cross section without reducing the torque carrying capacity of the coupling; and to make practical the use of hubs formed from powdered metal.

The foregoing and other objects and advantages of the invention will appear in the following detailed description of a preferred embodiment of the invention, in which reference is made to the accompanying drawing.

DETAILED DESCRIPTION OF THE ILLUSTRATED EMBODIMENTS

Figure 1:
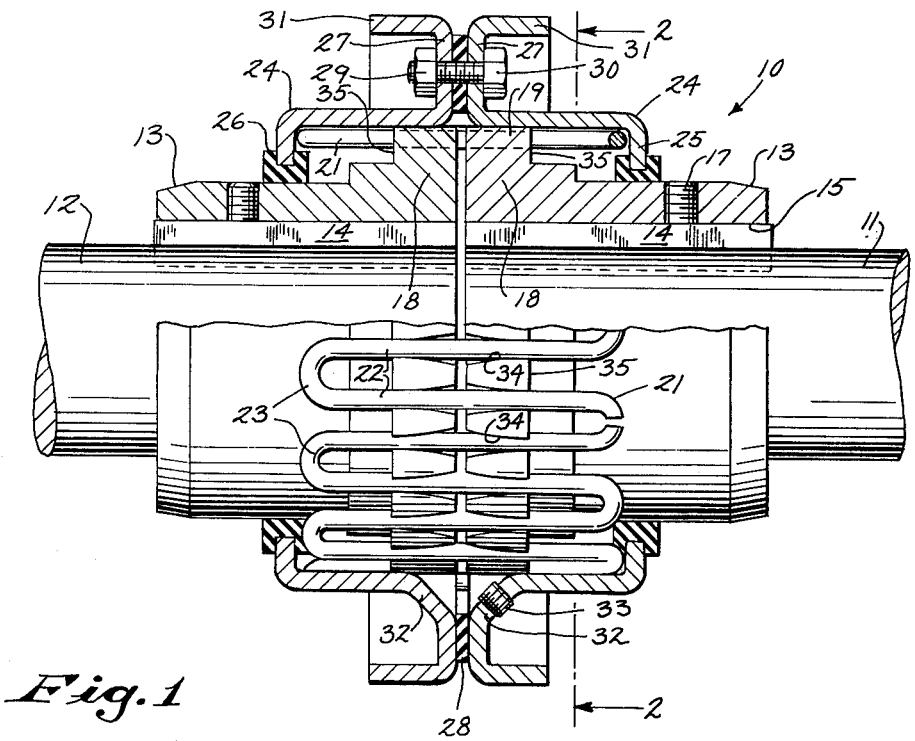
FIG. 1 is a view in side elevation, with parts broken away and parts shown in section, of a first embodiment of a coupling in accordance with the present invention.
Figure 2:
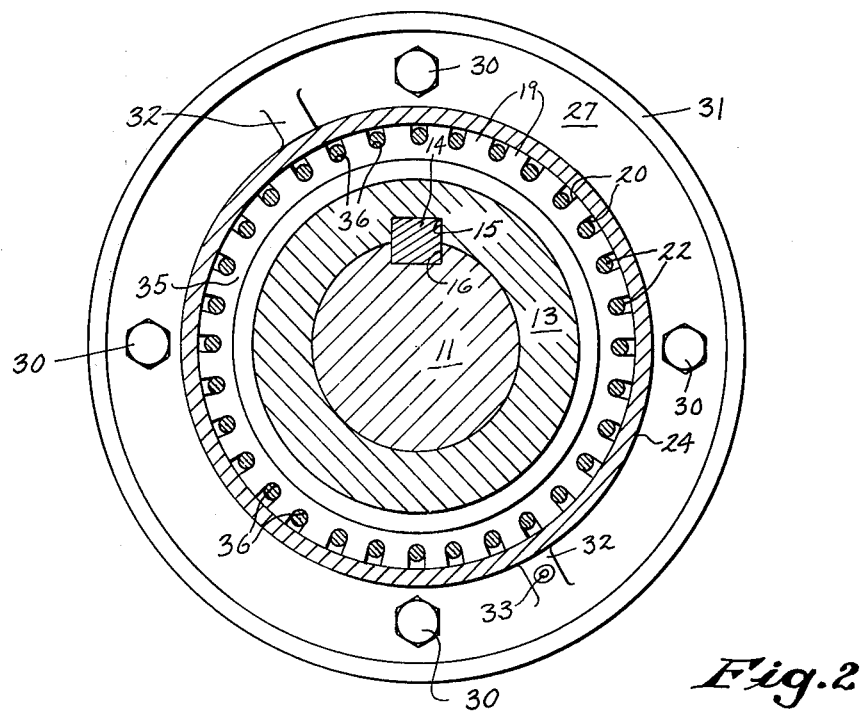
FIG. 2 is a view in vertical section taken in the plane of the line 2—2 of FIG. 1.

Referring to FIGS. 1 and 2, the coupling of the first embodiment, indicated generally by the reference numeral 10, is shown connecting substantially aligned shafts 11 and 12, either one of which may be the driving shaft and the other the driven shaft. The coupling includes two similar hub members 13 adapted to be connected in spaced relation upon the shafts 11 and 12. The hub members 13 are secured to the shafts 11 and 12 for rotation therewith by keys 14 which are received in cooperating keyways 15 provided in the hub members 13 and keyways 16 provided in the shafts 11 and 12. The keys 14 are restrained from axial movement by set screws 17.

Each hub member 13 includes a flange portion 18 disposed peripherally about that portion of the hub adapted to be placed in facing relation with the adjacent hub. The flange portions 18 are each provided with a series of radially spaced, axially directed teeth 19 and the teeth 19 define grooves 20 therebetween. A serpentine type grid member 21 has straight rungs 22 seated in the grooves 20 and connected by integral end loops 23.

A suitable coupling cover is provided to prevent the entry of dust and grit to the working portions of the coupling, and also to act as a lubricant retainer housing for the coupling. The cover comprises two similar cover halves designated generally by the numeral 24. Each cover half includes a radially bent, inwardly directed, portion 25 which is seated in a suitable resilient sealing ring 26 disposed about the periphery of the hub member 13. The cover halves 24 also include radially bent, outwardly directed, portions 27 which are adapted to be placed in spaced relation separated by a gasket 28. The cover halves 24 are secured together by cooperating nuts 29 and bolts 30 received in suitable peripherably spaced holes provided in the bent portions 27 and in the gaskets 28. The cover halves 24 terminate in axially directed bent portions 31 which cooperate to form a protective shield for the bolts 30 and nuts 29. The coupling havles 24 also each include inclined wall portions 32 at two diametrically opposed positions. A lubrication opening extends through one of the inclined portions 32 of each of the cover halves and is normally closed by a plug 33.

As is usual in this type of coupling, the opposing side walls 34 of the teeth 19 are curved in the axial direction so that they diverge adjacent the opposing faces of the flange portions 18 of the hubs. Preferably the opposing side walls 34 are formed as circular cylindrical surfaces having their center at the back face 35 of the teeth 19. Such curvature of the teeth 19 permits the unsupported length of the rungs 22 to be reduced as the torque load on the coupling increases, in a known manner.

In the first embodiment, the bottoms 36, or radially innermost surfaces, of the grooves 20 are rounded. At the narrowest width of grooves 20, which will occur at the back face 35 of the teeth, the bottoms 36 are preferably formed as arcs of a circle. The grid 21 has a circular cross section which will mate with the rounded bottom of the grooves 20 at their narrowest width.

In assemblying the coupling in accordance with this invention, after the hubs 13 have been mounted on the shafts 11 and 12, lubricant in the form of a suitable grease is packed in the grooves 20 and the grid 21 is then put in place within the grooves. After the cover is mounted, the lubrication plug 33 would be removed and a lubricating grease would be forced under pressure to fill the space surrounded by the cover. By use of the grid 21 of a circular cross section mating with the rounded bottoms 36 of the grooves 20, improved lubrication is achieved. A film of lubricant will surround the radially inner half of each rung 22 to provide a large lubricant film area. As a result of the improved lubrication available in the coupling of this invention and as a further result of the absence of sharp corners at the roots of the teeth 19, the fatigue life of the coupling is significantly improved. Because the bottoms 36 of the grooves 20 are rounded, the roots of the teeth 19 sweep gently upwardly from the flange portion 18 of the hub and there are no sharp corners at which to concentrate stresses which could lead to fatigue cracks.

The grid with circular cross section is more flexible than a rectangular or trapazoidal grid having the same section modulus. Therefore, even though it can handle the same amount of torque as a rectangular or trapazoidal grid, the circular grid will be capable of accommodating greater shaft misalignments. Also, a round grid with the same section modulus as a rectangular or trapazoidal grid will have a smaller radial dimension. As a result, the teeth 19 can be shorter and the resulting grooves 20 shallower. This improves the torque carrying capacity of the teeth. It also allows the use of a larger shaft bore in the hubs in relation to the hub diameter.

A coupling hub in accordance with the first embodiment is ideally suited by reason of its geometry to be manufactured using powder metallurgy techniques. This results from the shallower depth of the grooves between teeth and the rounded bottoms of the grooves. A sintered alloy steel including between 4 and 4.5% nickel and 1 and 1.2% copper may be used for forming the hubs by powder metallurgy techniques.

The grid with the circular cross section will be easier to assemble onto the hubs 13 than would a rectangular grid for the reason that the rounded contours of the grid will permit the grid to be partially inserted into the grooves with little difficulty, after which the grid can be forced to seat in the bottoms of the grooves. The round grid will be more flexible than a rectangular or trapazoidal grid of equal torque capacity. This greater flexibility will also contribute to ease of assembly.

Assembly of the grid can be made even easier by providing the teeth of the hubs with opposing side walls which diverge radially outwardly, instead of using opposing parallel side walls as in the first embodiment. Thus, referring to FIG. 3, a coupling hub 40 is provided with teeth 41 whose opposing side walls 42 and 43 are spaced more widely apart at the periphery of the hub 40 then at the roots of the teeth 41. The sides walls 42 and 43 of each tooth are parallel in the specific showing of FIG. 3. As a result, the tips of the teeth 41 do not interfere with the insertion of the grid rungs 44 into the slots between the teeth. The slots could diverge or taper to even a greater degree if desired, and attention is directed to the practical limit of slot taper disclosed in U.S. Pat. No. 3,079,773 to Schmitter.

Figure 3:
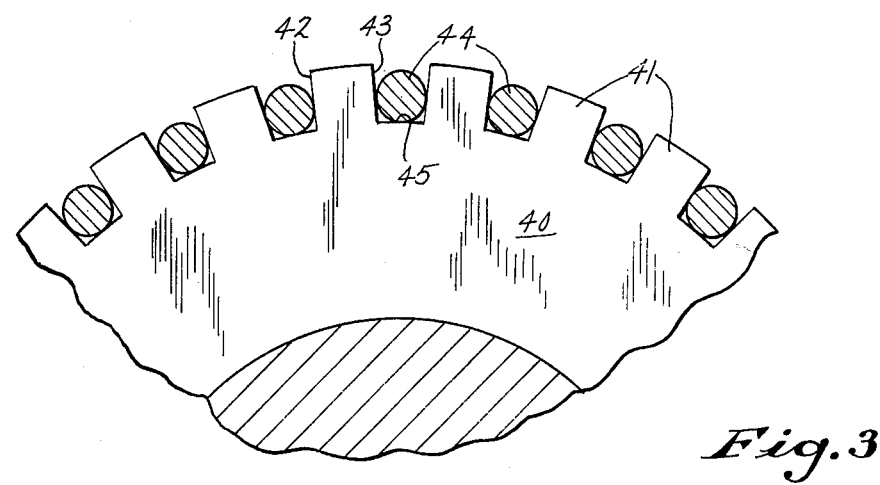
FIGS. 3, 4 and 5 are each views, partly in elevation and partly in section, of the hubs and grids of additional embodiments of the invention.

In the embodiment of FIG. 3, the slots are shown with a squared bottom 45. A rounded bottom as in the first embodiment could also be used with the tapered slots. The use of square bottom slots provides a reservoir in the corners beneath the grid 44 for lubrication so that in operation centrifugal force can cause such lubricant to be distributed radially outwardly to the contacting surfaces of the grid rungs 44 and side walls 42 and 43.

Figure 4:
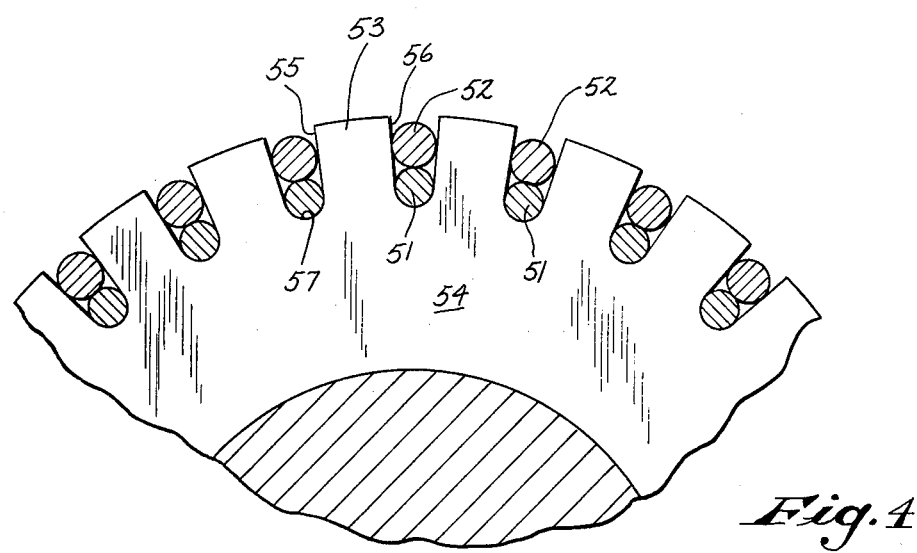
Figure 5:
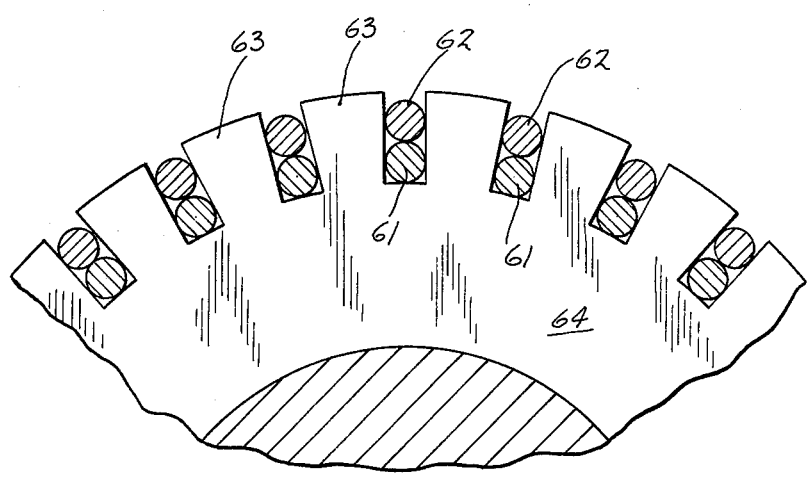

Multiple layers of interconnecting round grids can also be advantageously used where it is desired to reduce coupling stiffness while maintaining a high torque capacity. Referring to FIG. 4, two layers of grid rungs 51 and 52 are shown disposed in slots defined by teeth 53 of a hub 54. The slots have outwardly diverging opposing side walls 55 and 56, as in the embodiment of FIG. 3, and rounded bottoms 57, as in the embodiment of FIGS. 1 and 2. The outer rungs 52 have a larger diameter so that the rungs 52 will contact the diverging side walls 55 and 56. In FIG. 5, two layers of grid rungs 61 and 62 are illustrated mounted in slots defined between teeth 63 of a hub 64. In the embodiment of FIG. 5, the slots have parallel sides and the rungs 61 and 62 of both grids have identical cross sections.

The multiple layer grids of the embodiments of both FIGS. 4 and 5 will exhibit reduced coupling stiffness without loss of torque capacity, as compared with a solid one piece rectangular or trapazoidal grid.

In each of the embodiments of FIGS. 3, 4 and 5, the opposing side walls of the teeth may also be curved in the axial direction, in a known manner. Furthermore, each may include a housing formed of covers as in the first embodiment.

We claim:

1. In a coupling for connecting driving and driven shafts, which coupling includes a pair of hubs connectable to said shafts for rotation therewith with each hub having a plurality of axially extending teeth which define between them a series of axially directed grooves, the teeth of each hub being so shaped that each groove flares at the face of said teeth which opposes the teeth of the other hub, and a grid interlacing the teeth of both hubs, and including a series of rungs each lying in a groove of each hub, wherein the improvement comprises:

each of said rungs having a circular cross section, and
the bottom of each groove being rounded and being formed at the narrowest width of the groove as an arc of a circle which mates with said rungs.

2. In a coupling for connecting driving and driven shafts, which coupling includes a pair of hubs connectable to said shafts for rotation therewith with each hub having a plurality of axially extending teeth which define between them a series of axially directed grooves, the teeth of each hub being so shaped that each groove flares at the face of said teeth which opposes the teeth of the other hub, and inner and outer grids interlacing the teeth of both hubs, each grid including a series of rungs lying in a groove of each hub, wherein the improvement comprises:

each of said rungs of said inner grid having a circular cross section,
the bottom of each groove being rounded and being formed at the narrowest width of the groove as an arc of a circle which mates with said rungs of said inner grid,
said teeth of each hub being further so shaped that each groove is tapered to diverge radially outwardly from the axis of rotation of the hub, and
each of said rungs of said outer grid having a circular cross section of greater diameter than the rungs of said first grid.

* * * * *